US011050784B1

(12) United States Patent
Mattison

(10) Patent No.: US 11,050,784 B1
(45) Date of Patent: Jun. 29, 2021

(54) MITIGATING A DENIAL-OF-SERVICE ATTACK

(71) Applicant: Amazon Technologies, Inc., Seattle, WA (US)

(72) Inventor: Timothy Mattison, Mount Kisco, NY (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 15/462,670

(22) Filed: Mar. 17, 2017

(51) Int. Cl.
*G06F 21/00* (2013.01)
*H04L 29/06* (2006.01)
*H04L 9/32* (2006.01)
*H04L 9/08* (2006.01)
*H04L 9/30* (2006.01)

(52) U.S. Cl.
CPC ........ *H04L 63/1458* (2013.01); *H04L 9/0841* (2013.01); *H04L 9/302* (2013.01); *H04L 9/3066* (2013.01); *H04L 9/3249* (2013.01)

(58) Field of Classification Search
CPC ... H04L 63/1458; H04L 9/0841; H04L 9/302; H04L 9/3066; H04L 9/3249
See application file for complete search history.

(56) References Cited

U.S. PATENT DOCUMENTS

| | | | | |
|---|---|---|---|---|
| 7,219,223 B1 * | 5/2007 | Bacchus | ............. | H04L 63/0428 713/150 |
| 9,692,640 B1 * | 6/2017 | Veladanda | .......... | H04L 41/0803 |
| 2007/0121596 A1 * | 5/2007 | Kurapati | ........... | H04L 29/06027 370/356 |
| 2011/0107098 A1 * | 5/2011 | Hong | ...................... | H04L 45/00 713/168 |
| 2014/0189807 A1 * | 7/2014 | Cahill | ..................... | G06F 21/41 726/4 |
| 2014/0222955 A1 * | 8/2014 | Islam | .................. | H04L 63/0876 709/217 |
| 2014/0325648 A1 * | 10/2014 | Liu | ..................... | H04L 63/1458 726/22 |
| 2015/0127789 A1 * | 5/2015 | Lissack | ............... | H04L 41/5022 709/221 |
| 2015/0139422 A1 * | 5/2015 | Jover | .................... | H04W 12/04 380/270 |
| 2017/0019335 A1 * | 1/2017 | Schultz | ............... | H04L 43/0876 |
| 2017/0142153 A1 * | 5/2017 | Yang | ..................... | H04L 9/0838 |
| 2017/0244730 A1 * | 8/2017 | Sancheti | ............. | H04L 63/0245 |
| 2017/0374098 A1 * | 12/2017 | Kish | .................. | H04L 63/1458 |

* cited by examiner

*Primary Examiner* — Kendall Dolly
*Assistant Examiner* — Michael M Lee
(74) *Attorney, Agent, or Firm* — Davis Wright Tremaine LLP

(57) ABSTRACT

A technology is provided for mitigating an attack against a host service. Receive a connection from a client using a first cipher suite to authenticate the client. Identify that a distributed denial-of-service (DDoS) attack is occurring from a plurality of clients. Change the first cipher suite to a second cipher suite wherein the second cipher suite is more computationally intensive than the first cipher suite. Disconnect with the client and causing the client to reconnect using the second cipher suite.

20 Claims, 7 Drawing Sheets

MITIGATING A DENIAL-OF-SERVICE ATTACK

BACKGROUND

Computing systems may be found in the workplace, at home, or at school. Computing systems may include computing and data storage systems to process, transfer, and store data. A host service, such as a web server, may offer services to client computing systems. For example, a host service may provide data in the form of a web page, or may provide some other type of service such as data storage. The host service may be able to connect with a plurality of clients including different types of client devices. The host service may be described as a server computing system.

A host service may be maliciously attacked by one or more client computing systems. For example, a plurality of clients may connect to the host service and send superfluous requests to the host service induce the host to take action or otherwise respond. The superfluous requests use up resources of the host service such as network bandwidth and processing capabilities. If enough superfluous requests are received, the host service may be overloaded and unable to provide services or respond to legitimate requests from other clients. This type of attack may be described as a denial-of-service (DoS) attack. A host service may also be attacked using a distributed denial-of-service (DDoS) attack where one user employs a plurality of unique IP addresses and/or devices to carry out the attack. A host service may have difficulty distinguishing between a legitimate request and a superfluous request that is part of an attack. As the complexity and reach of computing networks increase, the complexity of such DDoS attacks continues to increase.

DETAILED DESCRIPTION

Figure 1:
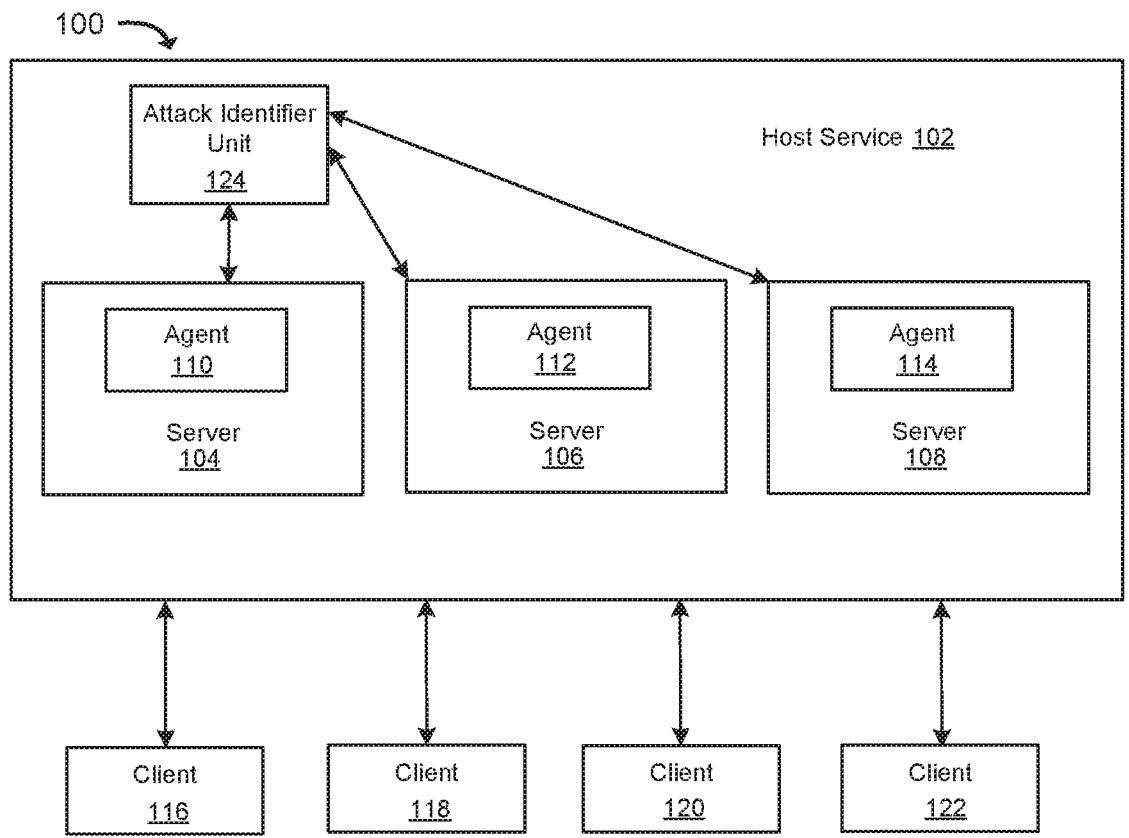
FIG. 1 is a block diagram illustrating a system for mitigating an attack against a host service, according to an example of the present technology.

The present technology may relate to mitigating attacks against a host service from client devices. For example, an attack may be a distributed denial-of-service (DDoS) attack from a plurality of clients connected to the host service. A portion of the clients may be embedded devices or Internet of Things (IoT) devices with reduced computing capabilities. IoT or embedded devices could be a wide range of devices, for example connected thermostats, speakers, routers, cameras, scales, door locks, security devices, medical devices, speakers, microphones, motion sensors, heat sensors, infrared sensors, appliances, handheld devices, location or positioning devices, environmental sensors, smoke detectors, water detectors, carbon monoxide detectors, altitude sensors. The clients participating in the attack may send superfluous or illegitimate requests to the host service to cause the host service to expend resources responding to the requests and may cause the host service to be unable to respond to legitimate requests from legitimate clients. The superfluous requests may be difficult for the host service to detect compared to the legitimate requests. For example, in a sophisticated attack reduced computing capacity IoT devices may be used as part of a botnet to perform a full three-way handshake and Transport Layer Security (TLS) negotiations with the host service. After the TLS negotiations the IoT devices may also be programmed to make requests that appear legitimate to the host service but simply waste the host service's resources.

One solution to negating a DDoS attack is to identify traffic that is not legitimate and re-route the illegitimate traffic so that those requests are not fulfilled. However, this technique may not be possible if the illegitimate traffic is from IoT devices that are able to perform TLS negotiations and send requests that appear legitimate. The present technology may mitigate such attacks by changing the cipher suite used by the clients to connect to the host service. For example, the plurality of clients connecting to the host service may have a list of available cipher suites for the clients to connect to the host service. The client may be able to choose among the list of available cipher suites. One of the cipher suites available may utilize ECC (elliptic curve cryptography) which is not as computationally intensive as an RSA cipher suite. A device such as an IoT device may have limited resources and is therefore likely to select a cipher suite utilizing ECC to connect to the host service.

The host service may identify that an attack, such as a DDoS attack, is underway. The host service may then change a first cipher suite to a second cipher suite for the clients to connect to the host service where the second cipher suite is more computationally intensive than the first cipher suite. This may be accomplished by de-prioritizing or removing the first cipher suite from the list of available cipher suites that are available to the clients for connecting to the host service and notifying the clients of the change. The client devices may then be disconnected from the host service and forced to reconnect using the second cipher suite. The host service may determine or measure that a given client's time to connect to the host service has experienced a slowdown using the second cipher suite compared to the first cipher suite. Alternatively, the host service may recognize that all or a large portion of traffic from particular types of clients is no longer being received. The host service may then determine or make a decision that traffic from the given client with the slowdown is illegitimate and this given client may, in one case, be blocked from the host service.

An IoT device or an embedded device with limited capabilities may take much longer to connect using a second cipher suite such as RSA compared to a first cipher suite such as ECC. In one aspect, an IoT device or embedded device may not be able to connect using the more computationally intensive second cipher suite which will effectively block illegitimate requests from such a device. However, client devices with sufficient computational power, e.g., that are not IoT or embedded devices, will be able to use the more computationally intensive cypher suite, e.g., RSA, with relatively little problem or delay in processing. Thus, those client devices will still be able to connect to the service with little problem. Thus, if the host services notice a reduced amount of illegitimate traffic after the switch to the more computationally intensive cipher suite, the host service may determine that devices that IoT devices or embedded devices are likely part of the attack, for example a botnet attack, and should be blocked during the attack. In one aspect, the present technology may be relied upon to identify when an attack is occurring by routing traffic through a server or cluster of servers that employs the second cipher suite that is more computationally intensive compared to the first cipher suite. For example, the clients connected to the host service may be alternately rotated through the server using the second cipher suite to determine if the clients experience a slowdown when connecting the server using the second cipher suite. If a predetermined number or portion of the clients experience such a slowdown, then the host service may determine or identify that an attack is underway. In one aspect, the client may experience a degradation in a performance characteristic using the second cipher suite compared to the first cipher suite. The client may be blocked if the degradation in the performance characteristic falls below a predetermined threshold. The performance characteristic may be a connection speed, latency, bandwidth, changes to packet flags such as a TCP congestion window flag, changes to network packet window size such as TCP window size, and/or other characteristics.

The host service may determine that the attack is over at a point in time. The host service may then revert back to first cipher suite. This may be accomplished by adding the first cipher suite back to the list of available cipher suites or by changing the priority of the first cipher suite. Changing the cipher suite or the priority of cipher suites and then reverting back after an attack may be described as toggling cipher suites.

FIG. 1 illustrates a computing environment 100 for mitigating an attack at a host service. The computing environment 100 may include a host service 102. The host service 102 may be described as a host service that is provided for client computing systems or devices such as clients 116, 118, 120, and 122. For example, the host service 102 may be a computing service that a client may connect to and make requests. The host service 102 may comprise a plurality of servers such as servers 104, 106, and 108. For example, the servers 104, 106, 108 may provide electronic pages, fulfill data store queries, store data, or perform other services. The servers may each be a computing device with capabilities and resources. The servers 104, 106, and 108 may be located physically close to one another or remotely located from one another. In one aspect, one or all of the servers 104 may be virtual computing instances executing in a service provider environment. The host service 102 is capable of connecting with a client device or computing system such as clients 116, 118, 120, and 122. The clients 116, 118, 120, and 122 may be computing devices such as a personal computer, a smart phone, a tablet, a laptop, an IoT device, an IoT device with reduced computing capabilities, or an embedded device. Each of the clients 116, 118, 120, and 122 may be a different device or device type from one another or the devices may be the same type. The clients 116, 118, 120, and 122 may be a virtual computing instance. It should be appreciated that the host service 102 may connect to more than four client devices and may be able to connect to any number of client devices.

The clients 116, 118, 120, and 122 may connect to the host service 102 by using a cipher suite to securely connect to the host service 102. The connection may be accompanied by handshakes or negotiations, such as a three-way handshake.

A host service 102 may have servers 104, 106, 108 which have a list of available cipher suites where the client, such as client 116, may choose which cipher suites on the list of available cipher suites may be employed to securely connect to the servers in the host service 102. For example, the client 116 may initiate a transmission control protocol (TCP) connection to a secure port on the server 104. The server 104 then sends a list of available cipher suites to the client 116. For example, the list of available cipher suites may include RSA or Elliptic curve Diffie-Hellman (ECDH) key agreement, RSA, Digital Signature Algorithm (DSA), or Elliptic Curve Digital Signature Algorithm (ECDSA) authentication and/or triple Data Encryption Standard (DES), DES, Advanced Encryption Standard (AES), or other ciphers. One cipher suite may be more or less computationally intensive than another cipher suite. The client 116 may choose the most efficient cipher suite by default. In one aspect, the client 116 is only capable of using one of the cipher suites available. In another configuration, the client 116 may be capable of using any of the cipher suites available. Once the client 116 has connected to the server 104 using one of the cipher suites, the client 116 may then make requests to the server 104.

In one aspect, the clients 116, 118, 120, and 122 may be routed by the host services to connect to any one of the servers 104, 106, and 108 or any other server of the host service 102. For example, the host service 102 may comprise a load balancer or traffic director that directs a particular request to a particular server. The request may be directed to a particular server for any number of reasons. For example, the server 104 may have particular capabilities or access to data that is needed to satisfy the request. In one example, the request is directed to a server to balance the traffic or load evenly between the servers 104, 106, and 108. In one aspect, the components of the host service 102 are composed of hardware devices. In one aspect, the components of the host service 102 are composed of virtualized devices and services that are hosted in a service provider environment. The service provider environment may offer centralized virtual computing services to a client, where the computing services are supported by computing systems and data that are located separately from the client and are accessed over a network (e.g., the internet or a wide area network). For example, the computing systems and services accessed may be, but are not limited to a virtual computing instance, a virtual network, a hyperlinked resource, a data store, a managed service, a resource external to the service provider environment, and a program code function. A computing instance or a virtual computing instance may refer to a virtual computer hosted on one or more hardware computing systems and that may execute services or software, such as an operating system, that are accessible to the client.

In one aspect, a client, such as the client 116, is an IoT device, or an embedded device that has limited resources that may slow down a speed of making a connection when using a cipher suite that is more computationally intensive than another cipher suite. Elliptic curve cryptography (ECC) was intentionally designed to be more efficient for devices with limited resources such as an IoT device. For example, a device with limited resources may take longer or experience a slowdown when connecting to the host service 102 using RSA as compared to connecting to the host service 102 using ECC. In one specific example, a device with limited resources may take twice as long to connect to the host service 102 using RSA as compared to ECC. In another example, a device with limited resources may be able to connect to the host service 102 using TLS but may not have sufficient capabilities to connect to the host service 102 using RSA. For example, a device with limited resources may not be able to connect to the host service 102 using a cipher suite that is more computationally intensive and the device with limited resources may crash or be disabled if attempts are made to use the more computationally intensive cipher suite. However, a device with more resources than IoT device, such as a smart phone, a tablet, or a personal computer, may not experience a slowdown when connecting to the host service 102 using RSA as compared to using ECC.

In one aspect, one or more of the clients 116, 118, 120, and 122 or other client devices connected to the host service 102 may be employed in an attack against the host service 102. The attack may be a denial-of-service (DoS) attack, a distributed denial-of-service (DDoS) attack, or other type of attack. For example, the clients involved in the attack may send superfluous or illegitimate requests to the host service 102 to perform services or other actions. The superfluous requests may be designed to usurp the resources, such as processing power, memory, or bandwidth, of the host service 102 to prevent the host service 102 from satisfying legitimate requests to other clients. One user may employ a plurality of devices in a botnet to carry out an attack. A security system can identify patterns of bad data and filter or re-route traffic to mitigate the attack. However, it may be difficult for a security system to detect bad data from devices with limited resources such as an IoT device, an IoT device, or an embedded device. A botnet may include a large number of devices with limited resources that are employed during an attack. For example, these devices with limited resources may be capable of satisfying cipher suite negotiations, handshakes, etc. and then produce traffic that looks legitimate to the security system. Therefore, a security system may desire to block all traffic from IoT devices, embedded devices, or other devices with limited resources during an attack.

In one aspect, the host service 102 may be capable of identifying that an attack, such as a DDoS attack, is underway. This may be accomplished using the attack identifier unit 124 at the host service 102. In one aspect, the attack identifier unit 124 may monitor the capabilities or resources of the host service 102 to determine or identify if an attack is underway. For example, the attack identifier unit 124 may monitor the bandwidth of the host service 102 and when the capacity of the bandwidth reaches a predetermined time threshold then an attack is identified as being underway. In one configuration, the attack identifier unit 124 may employ historical data associated with traffic patterns to identify an attack. For example, historical data may identify behaviors regarding capacity levels of the host service 102 during peak and non-peak hours. In one aspect, the attack identifier unit 124 works in conjunction with the agents 110, 112, and 114 in the servers 104, 106, 108 to identify an attack.

Each of the servers 104, 106, and 108 are depicted with agents 110, 112, and 114 respectively. The agents 110, 112, and 114 may be a localized service executing on the servers 104, 106, and 108. The agents 110, 112, and 114 may be capable of controlling which cipher suites are available for a client 116 to connect to the server 104 within the host service 102. For example, agent 110 is associated with server 104 and is able to change, toggle, prioritize, de-prioritize, or remove a cipher suite from server 104.

Once an attack is identified as being underway against the host service 102, the agents 110, 112, and 114 may be employed to toggle the cipher suites for each of the servers 104, 106, and 108. For example, an agent 110 may remove or de-prioritize a first cipher suite, such as ECDHE or ECDSA, from the server 104. The clients connected to server 104 may then be forced to disconnect and reconnect to the server 104 using a second cipher suite, such as RSA, and the second cipher suite is more computationally intensive than the first cipher suite. In one aspect, the host service 102 removes all cipher suites from the available list of cipher suites for the client to use except for the second cipher suite. The agent 110 then monitors the clients 116-122 that reconnect to the host service 102 to identify which clients experience a slowdown in connecting to the server 104 using the second cipher suite or another change in a performance characteristic as compared to using the first cipher suite. The agent 110 may then determine that if a device experiences a slowdown in connecting or another change in a performance characteristic, then the device is likely being used as part of the attack against the host service 102. In one configuration, the agent 110 may then block the device or client 116 that experiences the slowdown. In one aspect, the agent 110 may block all devices that experience a slowdown using the second cipher suite if the slowdown in connection is longer than a predetermined time threshold. In one aspect, the agent 110 may communicate with the other agents in the host service 102 to identify which clients 116-122 have been blocked to ensure that any blocked clients do not connect to another server 104 in the host service 102.

By blocking the clients 116-122 or devices that experience a slowdown in connection using the second cipher suite, the host service 102 may be able to block the devices that have limited resources, such as IoT devices, while allowing devices with greater resource capacity, such as smart phones, to remain connected to the host service 102. By blocking the devices with limited resources, the host service 102 may mitigate an attack that is being carried out using devices or clients with limited resources. In one aspect, the attack identifier unit 124 may identify when an attack is over and then instruct or communicate to the agents to add, re-prioritize, or revert back to the first cipher suite. Thus, during time periods where no attack is detected, the first cipher suite, such as ECDHE or ECDSA, may be used by clients to connect to the host service 102. By reverting back to the first cipher suite, that is less computationally intensive than the second cipher suite, the workload may be reduced on the clients and/or the host service 102.

In one aspect, once an attack is identified as occurring against the host service 102, the host service 102 may implement a priority for the agents 110, 112, and 114 to put the most computationally intensive cipher suite first. The clients may then use the most computationally intensive cipher suite to connect to the host service 102 during the attack. During the attack, the policy may also instruct the agents 110, 112, and 114 to remove the least computationally inexpensive cipher suites from the list of available cipher suites. For example, the policy may remove one or more cipher suites.

In one aspect, during a time period where an attack is not detected, the host service 102 may employ keep alive messages to keep a connection with a client open. For example, if an attack is not detected, then client 116 may connect to the host service 102 using a first cipher suite and keep alive messages are used to keep the connection open such that the client 116 is not required to periodically reconnect to the host service 102. This saves time and computational resources because the client 116 does not have to connect more than once to a server 104 of the host service 102. However, once an attack is detected, the host service 102 may remove the keep alive messages and have the client to reconnect. The client 116 may first connect with a first cipher suite and then after the attack is detected and the keep alive messages are removed, the client 116 may use the second cipher suite to reconnect to the host service 102.

In one aspect, once an attack is identified as occurring against the host service 102, the clients may periodically reconnect to the host service 102. For example, during an identified attack, the host service 102 may employ the agent 110 to implement a policy for clients to periodically disconnect and reconnect to the host service 102. During the periodic disconnecting and reconnecting, the client may use the second cipher suite instead of the first cipher suite. By periodically reconnecting using the second cipher suite, a computational burden is placed upon the client because the second cipher suite is more computationally intensive than the first cipher suite. This may cause a device with limited resources to become bogged down and less capable of sending superfluous requests to the host service 102. In one aspect, this technique of periodic reconnecting may be used in place of blocking all clients that experience a slowdown with the second cipher suite compared to the first cipher suite. After the host service 102 determines that the attack is over, the host service 102 may suspend the policy to periodically disconnect and reconnect the clients.

In one aspect, once an attack is identified as occurring against the host service 102, the host service 102 may identify the cipher suite that is least used by the clients. The host service 102 may then implement a policy to prioritize the least used cipher suite such that the clients will use the least used cipher suite during the attack. This may be accomplished by the host service 102 changing the priority of the least used cipher suite on the list of available cipher suites, or may be accomplished by changing the list of available cipher suites to only list the least used cipher suite.

In one aspect, once an attack is identified as occurring against the host service 102, the host service 102 may disconnect from each client and cause each client to reconnect using the second cipher suite. As the attack continues, the host service 102 may cause the clients to disconnect after each request has been made by the clients and cause the clients to reconnect using the second cipher suite for each new request that is made.

In one aspect, the agents 110, 112, and 114 are used by the attack identifier unit 124 to identify that an attack is underway. For example, the agents 110, 112, and 114 may periodically remove or de-prioritize a first cipher suite, such as ECDHE or ECDSA, from the servers 104, 106, and 108 and add or prioritize a second cipher suite. This may only be done for a limited time period. The attack identifier unit 124 may then monitor the traffic on the host service 102 during this limited time period. If the attack identifier unit 124 detects that the traffic significantly decreases during this limited time period, then the attack identifier unit 124 may determine that an attack is underway and implement policies at the agents 110, 112, and 114 to use the second cipher suite to mitigate the attack.

Figure 2:
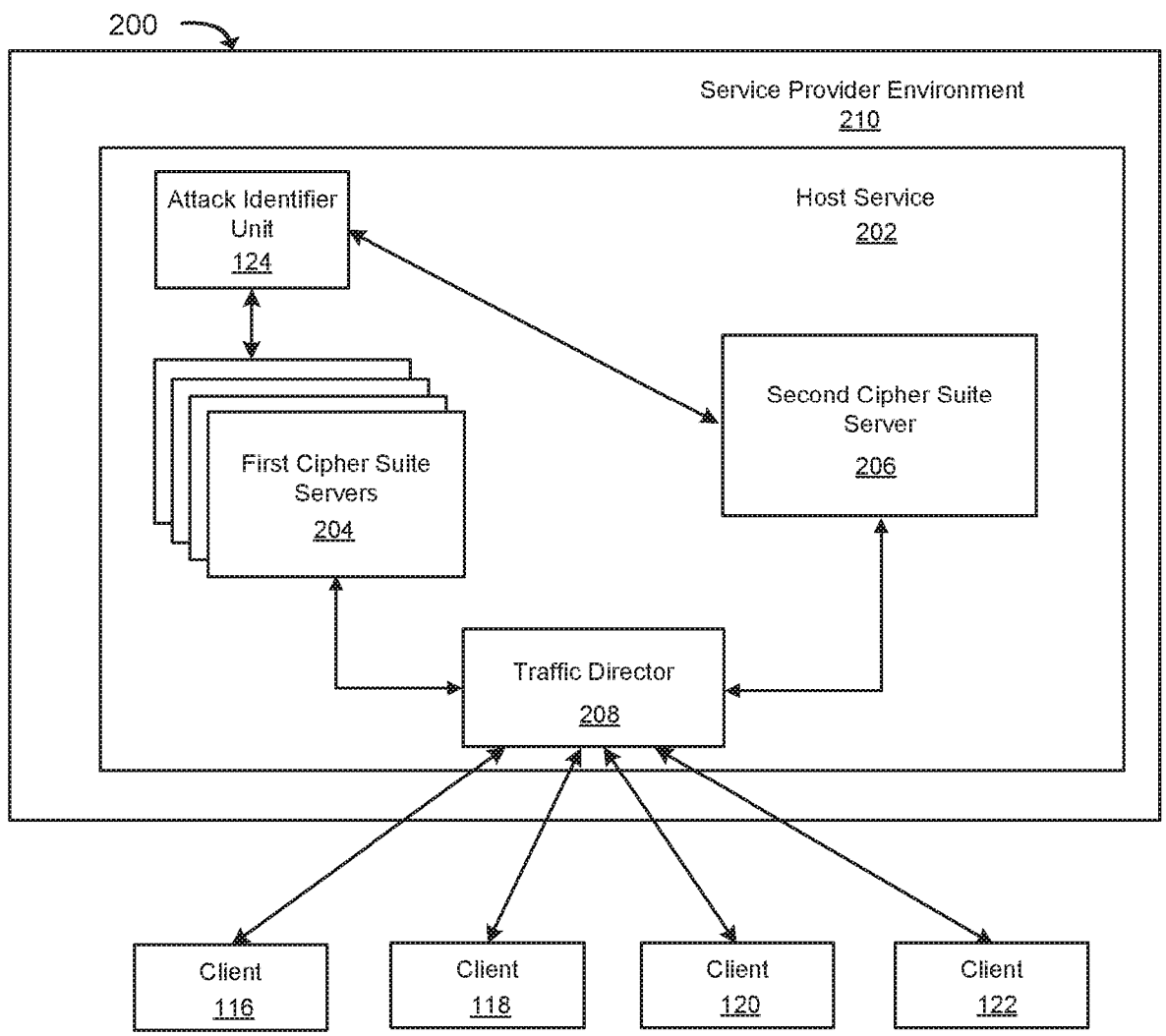
FIG. 2 is a block diagram illustrating a system for identifying and mitigating an attack against a host service, according to an example of the present technology.

FIG. 2 illustrates a computing environment 200 for mitigating an attack against a host service. The computing environment 200 may comprise some or all of the features, components, and capabilities of the computing environment 100 of FIG. 1. The computing environment 200 comprises first cipher suite servers 204 which may be capable of providing services to the clients 116, 118, 120, and 122 similar to the servers 104, 106, and 108 of FIG. 1. Each of the first cipher suite servers 204 may have an agent associated with the given server.

In one aspect, a client, such as the client 116, initiates a connection to a server in the host service 202 to make a request. The host service 202 may be made up of hardware devices, or may be composed of virtualized devices and services that are hosted in a service provider environment 210. The traffic director 208 may receive the initiation and directs the client 116 to one of servers from the group of first cipher suite servers 204. The server may then use a cipher suite to complete the connection to the client 116 and may receive a further request from the client 116. In one aspect, the host service 202 and the attack identifier unit 124 employs the second cipher suite server 206 to identify when an attack against the host service 202 is underway. For example, the traffic director 208 may be instructed by the attack identifier unit 124 to rotate a portion of the incoming traffic from the clients 116, 118, 120, and 122 to the second cipher suite server 206. The second cipher suite server 206 may be a single server, or may be a plurality of servers such as a cluster of servers. The first cipher suite servers 204 may employ cipher suites that are not as computationally intensive such as ECC where the second cipher suite server 206 employs a second cipher suite, such as RSA, that is more computationally intensive compared to the cipher suites available at the first cipher suite servers 204. The first cipher suite servers 204 may employ any number of cipher suites and may make a list of cipher suites available to the clients for the clients to select a cipher suite of choice for connecting. The attack identifier unit 124 may then monitor the traffic at the first cipher suite servers 204 compared to the traffic at the second cipher suite server 206 to determine or identify if there is an attack underway. For example, if an attack is underway, then the attack identifier unit 124 may identify that a portion of the clients connecting to the second cipher suite server 206 are experiencing a slowdown compared to when the same portion of clients connected to the first cipher suite servers 204 with a first cipher suite. The attack identifier unit 124 may then instruct the first cipher suite servers 204 to prioritize or add the second cipher suite over the first cipher suite, or remove the first cipher suite, during the duration of the attack.

In one aspect, the traffic director 208 periodically rotates traffic from a selected client to the second cipher suite server 206. The second cipher suite server 206 may provide the same services and satisfy requests the same way as the first cipher suite servers 204, but the second cipher suite server 206 may have the clients to use the second cipher suite to connect. After a period of time, the selected client is rotated back to the first cipher suite servers 204 and different clients are rotated to the second cipher suite server 206. Thus, a portion of the traffic may be sent to the second cipher suite server 206 and the portion may change or rotate during the operations of the host service 202. In one aspect, the second cipher suite server 206 is a cluster of servers.

Figure 3:
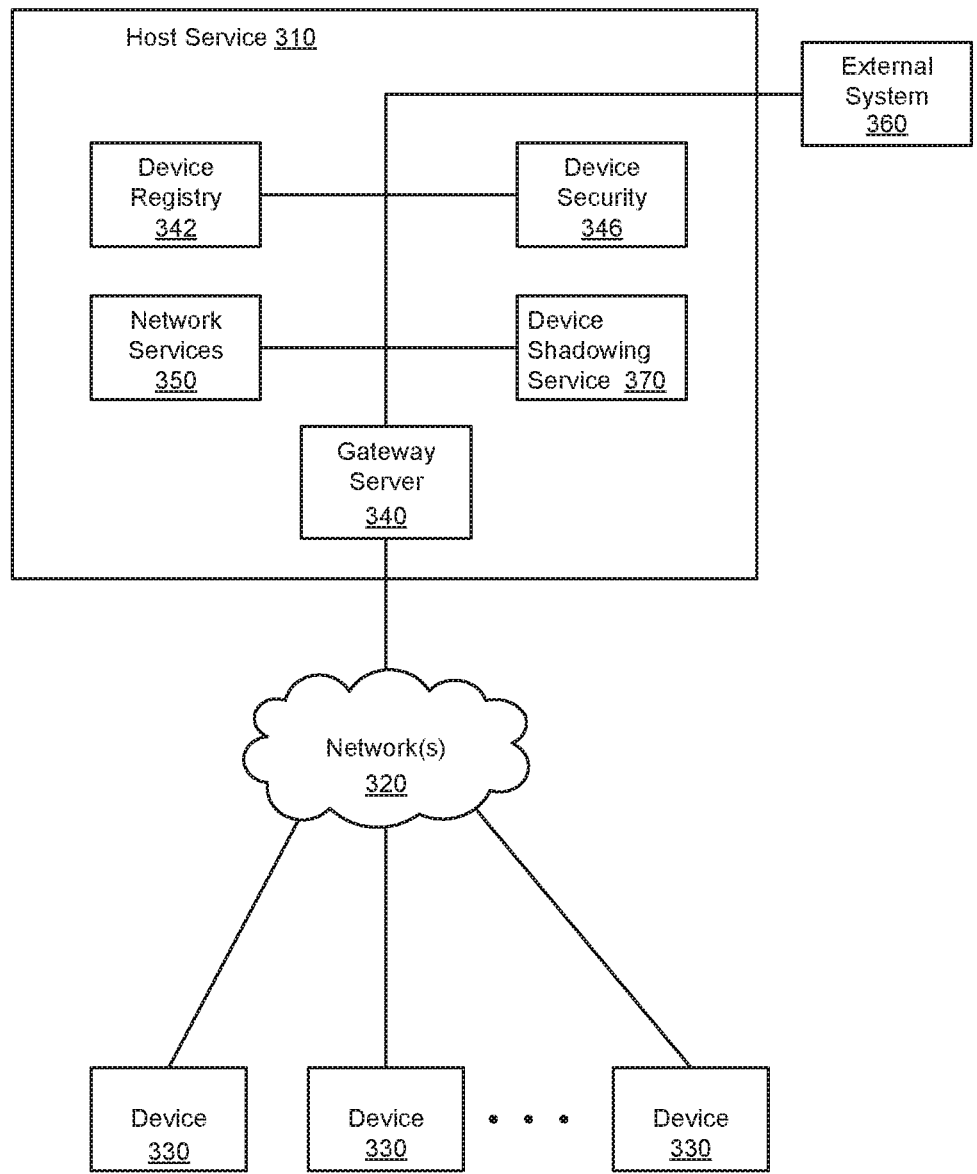
FIG. 3 is a block diagram of an example computer networking architecture for providing devices access to network services in a host service environment.

FIG. 3 is a block diagram illustrating an example host service 310 with which the devices 330 (e.g., an internet capable device) described earlier may communicate. Particularly, the environment of FIG. 3 may be useful for IoT devices as described earlier. The IoT device may be able to use the IoT services illustrated in FIG. 3 once connected using the technology described in FIG. 1 and FIG. 2. The host service 310, which may be referred to as a host service or system that comprises various resources made accessible via a gateway server 340 to the devices 330 that access the gateway server 340 via a network 320. In one aspect, the host service 310 is in a service provider environment providing services via virtual computing instances and may be described as cloud services. The devices 330 may access the host service 310 in order to access services such as a device shadowing service 370, data storage, and computing processing features. Services operating in the host service 310 may communicate data and messages to the devices 330 in response to requests from the devices 330 and/or in response to computing operations within the services. The host service 310 and the associated components may be used to connect an IoT device to a server in a host service such as server in the first cipher suite servers 204 of FIG. 2. However, the host service 310 may or may not identify that a device is an IoT device as opposed to a different class of compute device. The present technology may be used in conjunction with the components of host service 310 to mitigate an attack. For example, the host service 310 may be used to initially connect the device 330 to a server using a first cipher suite, and once an attack is identified, then the attack may be mitigated by changing the first cipher suite to a second cipher suite that is more computationally intensive.

The host service 310 may comprise communicatively coupled component systems 340, 342, 346, 350 and 370 that operate to provide services to the devices 330. The gateway server 340 may be configured to provide an interface between the devices 330 and the host service 310. The gateway server 340 receives requests from the devices 330 and forwards corresponding data and messages to the appropriate systems within the host service 310. Likewise, when systems within the host service 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the host service 310. In one example, the gateway server 340 may be adapted to convert a message received using the HTTPS protocol into a JSON formatted message that is suitable for communication to other servers within the host service 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the host service 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage multi-step device state transitions as described earlier. The device shadowing service server 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the host service 310. In one example, the device security server 346 may be programmed to process requests to register devices with the host service 310. For example, entities such as device manufacturers, may forward requests to register devices 330 with the host service 310. The device security server 346 receives registration requests and assigns unique device identifiers to devices 330 which use the device identifiers on subsequent requests to access the host service 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the host service 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in host service 310 or which communicates the request to the host service 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access host service 310 for any number of purposes. In one example, an external system 360 may be a system adapted to forward requests to register devices 330 with the host service 310. For example, an external system 360 may include a server operated by or for a device manufacturer that sends requests to host service 310, and device security server 346 in particular, to register devices 330 for operation with host service 310. Similarly, the external system 360 may be a system operated to provide a gateway for entities (individuals or organizations) to register an ownership or control relationship with a particular device 330.

The devices 330 may be any devices that may be communicatively coupled via a network 320 with the host service 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the host service 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within host service 310. The gateway server 340 may be programmed to receive and, if needed, attend to converting such requests for processing with the host service 310.

Figure 4:
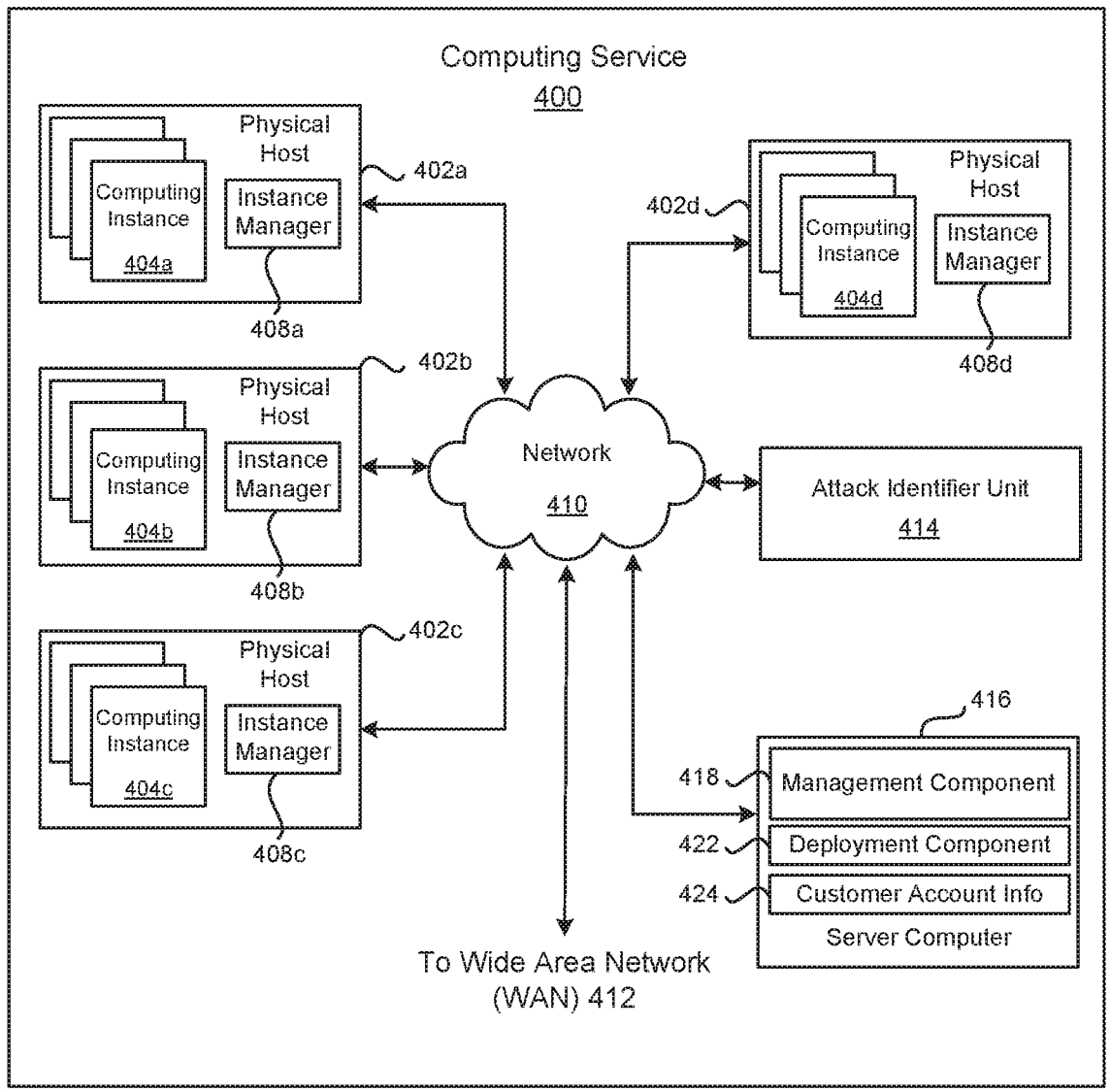
FIG. 4 is a block diagram that illustrates an example computing service environment according to an example of the present technology.

FIG. 4 is a block diagram illustrating an example computing service 400 that may be used to execute software services in a computing service environment or service provider environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute. In one aspect, the host service of the present technology may employ virtualized servers in a service provider environments. Each of the computing instances 404a-d may employ an agent such as agents 110, 112, and 114 of FIG. 1 to toggle cipher suites during an attack against the host service 202. Attack identifier unit 414 may be used to detect or identify if an attack is underway against the host service 202 using the computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked clients, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402*a-d*. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e., a computer) that executes applications like a physical machine. In the example of a virtual machine, each of the server computers 402*a-d* may be configured to execute an instance manager 408*a-d* capable of executing the instances. The instance manager 408*a-d* may be a hypervisor, virtual machine monitor (VMM), or another type of program configured to enable the execution of multiple computing instances 404*a-d* on a single server. Additionally, each of the computing instances 404*a-d* may be configured to execute one or more applications.

One or more server computers 416 may be reserved to execute software components for managing the operation of the computing service 400 and the computing instances 404*a-d*. A server computer 416 may execute a management component 418. A customer may access the management component 418 to configure various aspects of the operation of the computing instances 404*a-d* purchased by a customer. For example, the customer may setup computing instances 404*a-d* and make changes to the configuration of the computing instances 404*a-d*.

A deployment component 422 may be used to assist customers in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a customer that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache may be prepared, and other types of information. The deployment component 422 may utilize the customer-provided configuration and cache logic to configure, initialize, and launch computing instances 404*a-d*. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
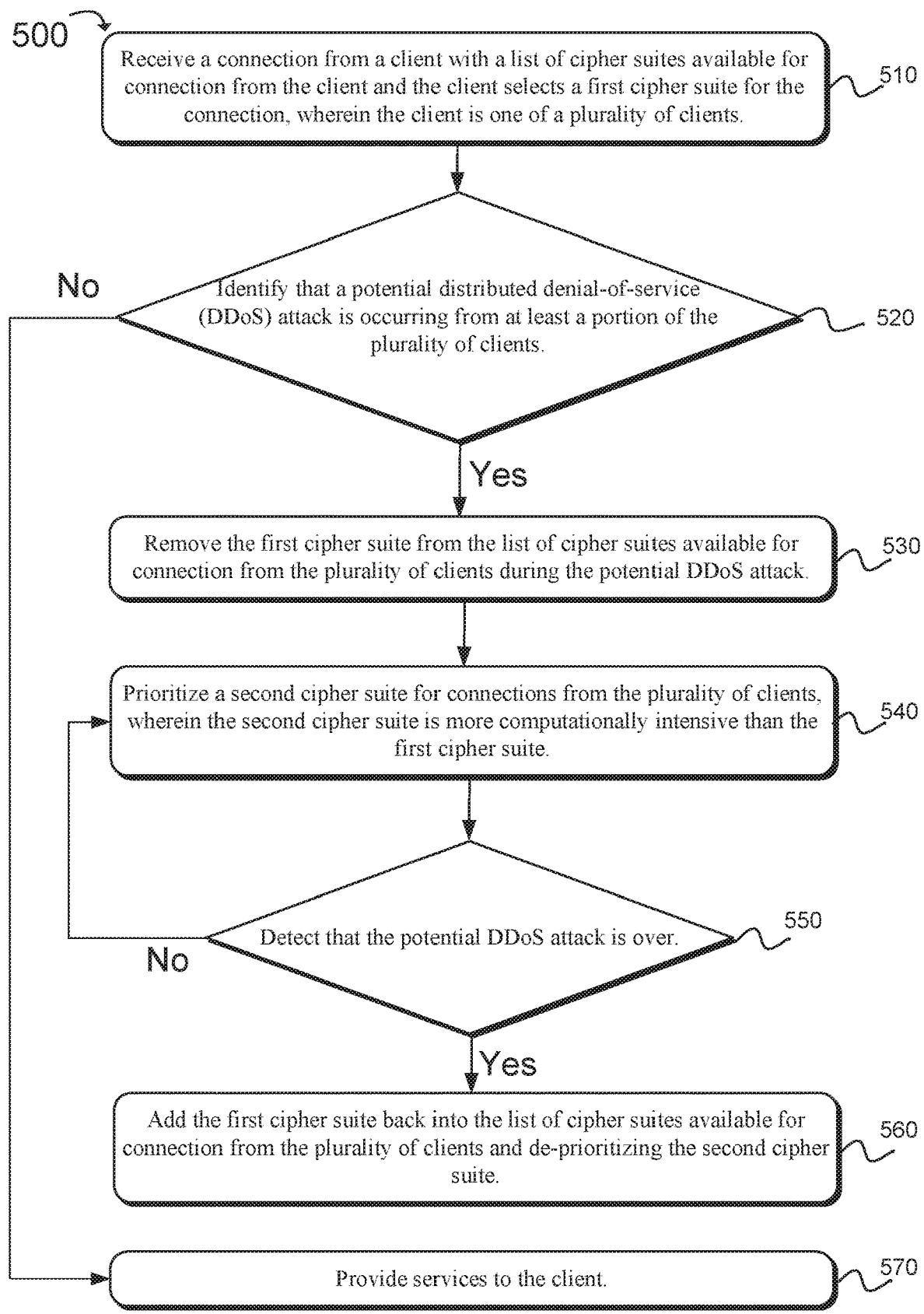
FIGS. 5 and 6 are flowcharts of example methods for mitigating an attack against a host service according to an example of the present technology.

FIG. 5 is a flowchart of an example method 500 for mitigating a distributed denial-of-service (DDoS) attack according to an example of the present technology. The functionality 500 may be implemented as a method and executed as instructions on a machine, where the instructions are included on at least one computer readable medium or one non-transitory machine-readable storage medium. For example, starting in block 510, Receive a connection from a client with a list of cipher suites available for connection from the client and the client selects a first cipher suite for the connection, wherein the client is one of a plurality of clients. Identify that a potential distributed denial-of-service (DDoS) attack is occurring from at least a portion of the plurality of clients, as in block 520. If no, provide services to the client, as in block 570. If yes, remove the first cipher suite from the list of cipher suites available for connection from the plurality of clients during the potential DDoS attack, as in block 530. Prioritize a second cipher suite for connections from the plurality of clients, wherein the second cipher suite is more computationally intensive than the first cipher suite, as in block 540. Detect that the potential DDoS attack is over, as in block 550. If yes, add the first cipher suite back into the list of cipher suites available for connection from the plurality of clients and de-prioritizing the second cipher suite, as in block 560. If no, revert back to block 540.

In one aspect, the method 500 further comprises, the first cipher suite is ECC and the second security suite is an RSA encryption. In one aspect, the method further identifies that the client device has a degradation in a performance characteristic using the second cipher suite compared to the first cipher suite, and may take the operation of blocking the client if the degradation in the performance characteristic falls below a predetermined threshold. The performance characteristic may be a connection speed, latency, bandwidth, changes to packet flags such as a TCP congestion window flag, changes to network packet window size such as TCP window size, and/or other characteristics. In one aspect, after the identifying the potential DDoS attack is occurring, disconnecting and reconnecting periodically with the client to cause the client to use the more computationally intensive second cipher suite.

Figure 6:
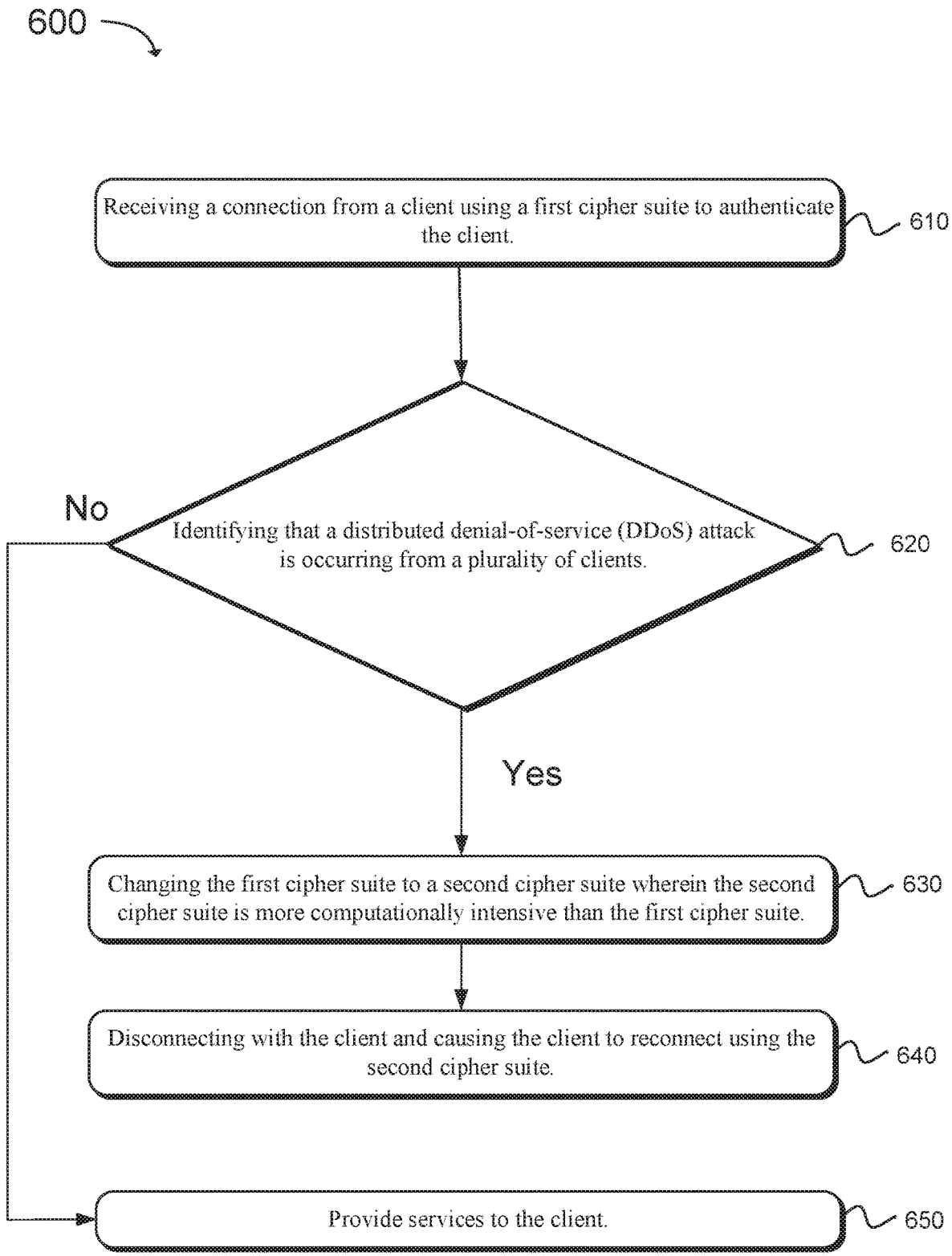

FIG. 6 is a flowchart of an example method 600 for mitigating a distributed denial-of-service (DDoS) attack according to an example of the present technology. The functionality 600 may be implemented as a method and executed as instructions on a machine, where the instructions are included on at least one computer readable medium or one non-transitory machine-readable storage medium. For example, starting in block 610, receive a connection from a client using a first cipher suite to authenticate the client. Identify that a distributed denial-of-service (DDoS)

attack is occurring from a plurality of clients, as in block 620. If no, provide services to the client, as in block 650. If yes, change the first cipher suite to a second cipher suite wherein the second cipher suite is more computationally intensive than the first cipher suite, as in block 630. Disconnect with the client and causing the client to reconnect using the second cipher suite, as in block 640. In one configuration, the client may be caused to reconnect using the second cipher suite for each request that is made by the client during the attack.

In one aspect, the method 600 further comprises, the first cipher suite is ECC and the second security suite is an RSA encryption. In one aspect, a host service is used to receive connections from the client and the host service comprises a plurality of servers and each server executes an agent to implement changing the first cipher suite to the second cipher suite.

In one aspect, the method 600 further comprises, identifying that the DDoS attack is over at the host, and reverting back to the first cipher suite to reduce a workload on the client. In one aspect, the method 600 further comprises, identifying that the client has a degradation in a performance characteristic using the second cipher suite compared to the first cipher suite, and blocking the client if the degradation in the performance characteristic falls below a predetermined threshold. The performance characteristic may be a connection speed, latency, bandwidth, changes to packet flags such as a TCP congestion window flag, changes to network packet window size such as TCP window size, and/or other characteristics.

In one aspect, the method 600 further comprises, employing keep alive messages at the host to keep connections with the client open after connecting with the first cipher suite, removing the keep alive messages after the identifying the DDoS attack is occurring, and reconnecting with the client via the second cipher suite. In one aspect, the method 600 further comprises, after the identifying the DDoS attack is occurring, disconnecting and reconnecting periodically with the client to cause the client to use the more computationally intensive second cipher suite.

In one aspect, the method 600 further comprises, the DDoS attack is identified by a change in a characteristic at a host service wherein the change in the characteristic is a change in capacity of bandwidth availability, an increase in latency, an increase in memory consumption, and/or an increase in auto-scaling. In one aspect, the method 600 further comprises, a plurality of cipher suites available to the plurality of clients for connecting to a host service, the method further comprising: identifying, at the host service, the least used cipher suite of the plurality of cipher suites available to the plurality of clients, employing the least used cipher suite as the second cipher suite such that each of the plurality of clients use the least used cipher suite as the second cipher suite to connect to the host service.

In one aspect, the method 600 further comprises, a host has a plurality of cipher suites available to the plurality of clients for connecting to the host, the method further comprising: selecting a cipher suite from the plurality of cipher suites to employ as the first cipher suite at a given client of the plurality of clients, after identifying the DDoS attack is occurring restricting the plurality of cipher suites available to only the second cipher suite.

In one aspect, temporarily routing traffic from the plurality of clients to a server of a host service that only employs the second cipher suite to identify whether a DDoS attack is occurring. In one aspect, DDoS attack occurs at a host service that comprises a web server and the client is an Internet of Things (IoT) device.

Figure 7:
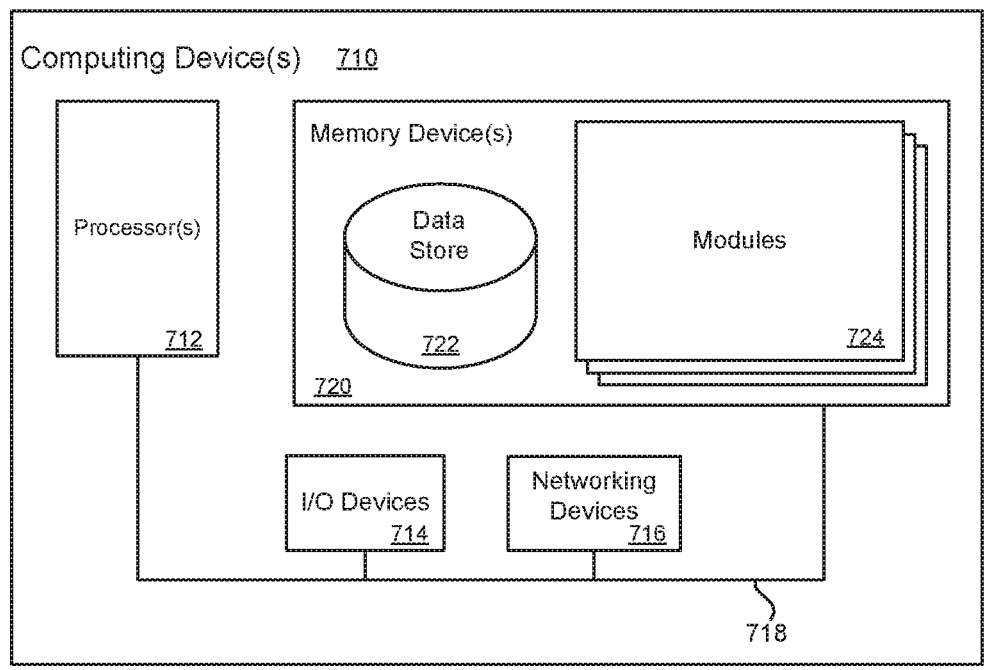
FIG. 7 is a block diagram that provides an example illustration of a computing device that may be employed in the present technology.

FIG. 7 illustrates a computing device 710 on which modules of this technology may execute. A computing device 710 is illustrated on which a high-level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configuration definitions, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations that comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed cause a system to mitigate a distributed denial-of-service (DDoS) attack, comprising:

receiving a connection from a client with a list of cipher suites available for connection from the client and the client selects a first cipher suite for the connection, wherein the client is one of a plurality of clients;

identifying that a potential distributed denial-of-service (DDoS) attack is occurring from at least a portion of the plurality of clients; and in response to the identifying, performing the following:

removing the first cipher suite from the list of cipher suites available for connection from the plurality of clients during the potential DDoS attack;

prioritizing a second cipher suite for connections from the plurality of clients during the potential DDoS attack, wherein the second cipher suite utilizes additional computational resources as compared to the first cipher suite;

identifying that the client has a degradation in a performance characteristic using the second cipher suite as compared to the first cipher suite;

detecting that the potential DDoS attack is mitigated based on the degradation of the performance characteristic of the client; and adding the first cipher suite back into the list of cipher suites available for connection from the plurality of clients and de-prioritizing the second cipher suite.

2. The non-transitory machine readable storage medium of claim 1, wherein the first cipher suite is Elliptic Curve Cryptography (ECC) and the second cipher suite is an RSA encryption.

3. The non-transitory machine readable storage medium of claim 1, further comprising:
blocking the client if the degradation in the performance characteristic meets a threshold.

4. The non-transitory machine readable storage medium of claim 1, wherein after the identifying the potential DDoS attack is occurring, disconnecting and reconnecting periodically with the client to cause the client to use the second cipher suite.

5. A method performed by a host, comprising:
selecting a first cipher suite from a plurality of available cipher suites to employ as a first cipher suite at a client of a plurality of clients, wherein the host has a plurality of cipher suites available to the plurality of clients for connecting to the host;
receiving a connection from the client using the first cipher suite to authenticate;
identifying that a distributed denial-of-service (DDoS) attack is occurring from the plurality of clients;
restricting communications with the client to a second cipher suite during the DDoS attack after identifying that the DDoS attack is occurring, wherein the second cipher suite utilizes additional computational resources as compared to the first cipher suite;
disconnecting from the client and causing the client to reconnect using the second cipher suite; and
identifying that the client has a degradation in a performance characteristic using the second cipher suite compared to the first cipher suite.

6. The method of claim 5, wherein the first cipher suite is Elliptic Curve Cryptography (ECC) and the second cipher suite is an RSA encryption.

7. The method of claim 5, wherein a host service is used to receive connections from the client and the host service comprises a plurality of servers that execute an agent to implement changing the first cipher suite to the second cipher suite.

8. The method of claim 5, further comprising:
identifying that the DDoS attack has been reduced; blocking the client; and reverting to the first cipher suite.

9. The method of claim 5, further comprising:
blocking the client if the degradation in the performance characteristic meets a threshold.

10. The method of claim 5, further comprising:
employing keep alive messages at a host service to keep connections with the client open after connecting with the first cipher suite;
removing the keep alive messages after identifying that the DDoS attack is occurring; and
reconnecting with the client via the second cipher suite.

11. The method of claim 5, wherein after identifying that the DDoS attack is occurring, disconnecting and reconnecting periodically with the client to cause the client to use the second cipher suite.

12. The method of claim 5, wherein the DDoS attack is identified by a change in a characteristic at a host service, wherein the change in the characteristic is a change in capacity of bandwidth availability, an increase in latency, an increase in memory consumption, or an increase in auto-scaling.

13. The method of claim 5, wherein a plurality of cipher suites are available to the plurality of clients for connecting to a host service, the method further comprising:
identifying, at the host service, a least used cipher suite of the plurality of cipher suites available to the plurality of clients; and
employing the least used cipher suite as the second cipher suite to connect to the host service.

14. The method of claim 5, further comprising:
routing traffic from the plurality of clients to a server of a host service that only employs the second cipher suite in order to identify whether a DDoS attack is occurring.

15. The method of claim 5, further comprising:
disconnecting the client after each request has been made by the client and causing the client to reconnect using the second cipher suite for each request made by the client.

16. The method of claim 5, wherein upon determining that the DDoS attack has ended, causing the client to reconnect using the first cipher suite.

17. A system, comprising:
a host service comprising one or more servers, including at least one processor and memory, to provide connections to a plurality of clients;
the one or more servers configured to:
connect to a first portion of the plurality of clients via a first cipher suite;
connect to a second portion of the plurality of clients via a second cipher suite by routing the second portion of the plurality of clients to a particular server of the one or more servers, wherein the second cipher suite utilizes additional computational resources as compared to the first cipher suite;
detect that a potential DDoS attack is occurring by determining that there is a degradation in a performance characteristic by the second portion of the plurality of clients when connecting to the particular server using the second cipher suite as compared to the first portion of the plurality of clients connecting using the first cipher suite; and
the host service is further configured to change the first cipher suite to the second cipher suite when a DDoS attack is detected.

18. The system of claim 17, wherein the first cipher suite is Elliptic Curve Cryptography (ECC) and the second cipher suite is an RSA encryption.

19. The system of claim 17, wherein each client of the plurality of clients is temporarily routed to connect to the host service using the second cipher suite.

20. The system of claim 17, wherein the second cipher suite is an infrequently used cipher suite of a plurality of cipher suites available to the plurality of clients.

* * * * *